United States Patent [19]
Revert

[11] 3,712,741
[45] Jan. 23, 1973

[54] APPARATUS FOR THE ACCURATE MEASUREMENT OF DIMENSIONS OF OBJECTS, ESPECIALLY THE DIAMETER OF CYLINDRICAL OBJECTS

[75] Inventor: Philippe Revert, Chateauneuf-du-Rhone, France

[73] Assignee: Commissariat A L'Energie Atomique, Paris, France

[22] Filed: Oct. 19, 1970

[21] Appl. No.: 81,883

[30] Foreign Application Priority Data

Nov. 6, 1969 France ........................6938215

[52] U.S. Cl. ............356/160, 250/219 WD, 356/167
[51] Int. Cl. ..........................................G01b 11/10
[58] Field of Search..............356/156, 159, 160, 167; 250/219 WD, 219 TH

[56] References Cited

UNITED STATES PATENTS

| | | | |
|---|---|---|---|
| 2,730,006 | 1/1956 | Gottschall | 356/159 |
| 2,941,087 | 6/1960 | Blumberg et al. | 356/167 |
| 3,204,109 | 8/1965 | Goodwin | 250/219 WD |
| 3,362,284 | 1/1968 | Patrignani | 356/167 |
| 3,414,725 | 12/1968 | Evans | 356/167 |
| 2,237,811 | 4/1941 | Cockrell | 356/159 |
| 2,514,985 | 7/1950 | Banner | 356/159 |
| 2,931,917 | 4/1960 | Beelitz | 356/159 |
| 3,365,699 | 1/1968 | Foster | 356/167 |

FOREIGN PATENTS OR APPLICATIONS

| | | | |
|---|---|---|---|
| 59,943 | 1968 | Germany | 356/159 |
| 1,548,361 | 6/1969 | Germany | 356/167 |

*Primary Examiner*—Ronald L. Wibert
*Assistant Examiner*—Jeff Rothenberg
*Attorney*—Cameron, Kerkam & Sutton

[57] ABSTRACT

The apparatus comprises two identical carriages mounted in opposite relation and driven in horizontal translational motion on a stationary frame, a stirrup mounted on each carriage for supporting an emitting and receiving optical system which defines a substantially vertical light ray having high definition, an optical gage and stops which are supported together with the cylindrical object to be measured on a fixed stage which is located substantially in the central horizontal plane of the stirrups, the stage being provided with a vertical slot for the passage of the light rays which are produced by the optical system.

The optical system comprises a stable light source, a photosensitive receiver, a capillary tube on each stirrup arm for defining the path of the light ray with high precision.

Means are also provided for controlling the rotation of the carriage-drive systems according to a preestablished program, for recording the relative displacements of the carriages and indicating numerically the relative translational displacements of the two light rays.

15 Claims, 7 Drawing Figures

PATENTED JAN 23 1973 3,712,741

APPARATUS FOR THE ACCURATE MEASUREMENT OF DIMENSIONS OF OBJECTS, ESPECIALLY THE DIAMETER OF CYLINDRICAL OBJECTS

This invention relates to an apparatus which is intended to carry out accurate measurements of the dimensions of objects and particularly the diameter of cylindrical objects such as, for example, the nuclear fuel pellets (uranium oxide, plutonium) which are employed in the field of nuclear energy as fuel element components in fast neutron reactors.

Said apparatus makes it possible in particular to take accurate and automatic measurements either of unitary samples or series of samples when it is desired, for example, to check the dimensions of such samples at a high speed and with a high degree of accuracy at the delivery end of a manufacturing process.

This apparatus for the accurate measurement of dimensions of objects and in particular of the diameter of cylindrical objects is essentially characterized in that it comprises in combination:

a roller-bearing table which is mounted on a stationary horizontal frame and on which are supported by means of a high-precision roller-bearing two identical carriages each adapted to carry a substantially stirrup-shaped member and located in oppositely-facing relation, each carriage being capable of displacement in horizontal translational motion on said frame under the action of a driving unit;

an emitting and receiving optical system which is mounted on each stirrup and defines between the two top and bottom arms of the stirrup a light ray having high definition which is substantially vertical and located in fixed relation to said stirrup;

a stationary supporting stage which is located substantially in the central horizontal plane of the stirrups and provided with a vertical slot through which the light rays carried by the stirrups are permitted to pass, the cylindrical object whose diameter is to be measured being intended to rest on said stage together with two optical stops, the second or inner stop being intended to serve as a reference gage;

means known per se which make it possible:
a. to control the rotation of the driving units electronically and in accordance with a pre-established program;
b. to record the relative displacements of the carriages and to indicate numerically the value of the horizontal movement of translation which produces the relative displacement of the two light rays;

means for detecting at the time of translational motion of each carriage the occultation of the light rays by the stops, the reference gage and the cylindrical object to be measured.

An essential feature of the apparatus according to the invention is the very special design of the optical system which is associated with each stirrup and produces a light ray having high definition. This optical system comprises, in the direction of travel of the light, a stable light source and a first capillary tube which are both fixed on the first arm of the stirrup as well as a second capillary tube and a photosensitive receiver which are both fixed on the second arm of the stirrup. The two capillary tubes referred-to are mounted in the stirrups so as to have very substantially the same geometrical axis which defines in practice and with a very high degree of precision the path of the light ray which is located in fixed relation to the stirrup. This original arrangement is very important since the light ray can consequently be formed in practice by selecting within a solid angle which is in fact close to zero a very small part of the luminous radiation which is emitted in all directions by the light source.

In accordance with the invention, the source can be either a simple incandescent lamp of the miniaturized type or preferably a gallium arsenide diode which is of special interest in the application under consideration by reason of its high emission stability. The capillary tubes employed have an internal diameter which can range from 0.1 to 1 mm, very satisfactory results having readily been obtained with capillary tubes having an internal diameter of 0.4 mm; the length of these tubes is not critical but is mostly of the order of 1 to 1.5 cm in the apparatus according to the invention. The photosensitive receiver should preferably be a silicon photodiode having distinctive detecting properties by reason of the very weak luminous flux which finally reaches the detector through the two serially mounted capillary tubes.

In this invention, the translational motion of each carriage is carried out by means which are known per se, namely either continuous-rotation motors fitted with rotary coders or stepping motors as in the example which will be given hereinafter; these motors which are fixed on the frame produce action by means of a reduction-gear system on a threaded rod which cooperates with a floating nut, said nut being coupled in translational motion with the carriage. The operation of the apparatus consists in observing the occultation of the light rays which are carried by each stirrup and which are accordingly cut off respectively by two stops, one of which serves as a reference gage, and by the object itself whose dimensions are to be measured, provision being also made for electronic means which serve to determine and to record the state of translational motion of one carriage relative to the other; in one embodiment, said means consist of a counter for counting the steps of the stepping motors; in another embodiment, said means consist of a counter for counting angular displacements by rotary coder; in any case, the means for determining and recording the state of translational motion serve to account in the negative direction the translational motions in which the two carriages move towards each other and in the positive direction the translational motions which cause the relative withdrawal of said carriages. Under these conditions, it is readily understood that the apparatus is somewhat similar to what might be referred-to as an "optical micrometer-gage", given the fact that the unitary step has been defined as a decimal fraction of the metric system, that units of length are consequently recorded directly by the step counter and that the indication or display corresponds finally to the horizontal distance between the two light rays, that is to say the dimension of the body to be measured. It is worthy of mention that, inasmuch as the measurement is carried out by optical feeling of the object to be inspected, the measurement takes place without any material contact with said object or interposition of any mechanism whatever.

This results on the one hand in accuracy of the results obtained and makes it possible on the other hand to take measurements from a distance if necessary, especially through a sealed enclosure such as the wall of a glove box, for example.

In accordance with one characteristic feature of this invention, the operation of the stepping motors is dependent on a pulse train which can be delivered either as a result of manual demand in order to carry out voluntary displacement of the carriages for the purpose of disassembly or centering prior to measurement or as a result of automatic measuring programs having a unitary measuring cycle or a repetitive measuring cycle in the case of long inspection runs; in the case of automatic displacements, the occultations of each light ray by the stops, the reference gage and the object to be measured serve to initiate each time either the stopping or changing of direction of rotation of the motors depending on the point of the measuring cycle which is considered.

In accordance with another characteristic feature of the present invention, provision is made for means of a type known per se whereby the objects to be subjected to measurement of one dimension are caused to progress in the measurement field along a slot having side walls which are cut in a V-shape, for example, in the stationary supporting stage.

In accordance with an equally important feature of this invention, the occultation of the light rays is defined and detected in an accurate and reproducible manner by virtue of the fact that the luminous flux which falls on the photosensitive receiver passes through at a predetermined value which is substantially equal to one-half of its maximum value: to this end, the current derived from the photosensitive element drives directly a trip system which is set at a predetermined threshold substantially in the vicinity of the mean value between on the one hand the dark current and on the other hand the maximum current corresponding to the complete absence of occultation of the light beam. This result is essential to the reproducibility of measurements supplied by the apparatus and consequently to its general sensitivity. Such a result is possible only by virtue of the fact that the light ray which is defined by means of the system of two capillary tubes mounted in series corresponds to a solid angle of such small value that the variation in the current delivered by the photosensitive element as a function of the forward progression of the occultation, or in the final analysis the rate of travel of the stirrup carriage, is known with a high degree of accuracy and is wholly reproducible from one occultation to the next. The representative function of this variation is expressed by an S-shaped curve which will be discussed hereinafter; within the definition of the present invention, the point of maximum slope of said curve is usually chosen so as to represent the value of current which initiates the operation of the trip system.

In order to take a measurement, the operation is carried out in practice as follows. In accordance with the invention, the stationary supporting stage is provided on each side of the slot which is intended to receive the object to be measured on the one hand with a first stop which serves as a reference gage and on the other hand with an outer stop which defines the limit of translational motion of each light ray. It is first necessary at the outset to calibrate the apparatus, that is to say to determine the spacing of the first reference stop and this operation is performed, for example, by means of a high-precision gage of the Johnson type. This calibrating gage is accordingly placed in the measurement field of the apparatus on the slot which is provided for this purpose and located in the stationary supporting stage. The initial step then consists in proceeding from the outer stop and locating in respect of each light ray the point of contact with the corresponding arm of the reference gage. This can be carried out by hand or in accordance with an automatic process which forms part of the programming of measurements; when occultation is achieved, a pre-selection value is recorded at this moment on a predeterminator and corresponds to an approximate value of the distance between the two arms of the reference stop. This recording operation is carried out by hand; the unitary measuring cycle is then started; as it then withdraws, each light ray located on each side of the calibrating gage will progress to the point of occultation by the stops located externally of the reference gage, then stops and returns to "feel" the reference gage. At this moment, the predetermination value passes into the counter. The light rays continue to travel up to the calibrating gage. At this moment, the contents of the counter are transferred to the display device; reading of the device at this instant will immediately give the error between the value recorded in the counter and the known true dimension of the Johnson gage employed; this reading accordingly provides the true value of the distance between the two arms of the reference gage which is recorded manually in the predetermination device and the reference gage can then perform its intended function. Finally, the light rays travel outwards again and are occulted on the inner side of the reference gage. The body which it is desired to check by measurement of a particular dimension is then substituted for the Johnson gage. By re-starting the same cycle, the counter will this time be calibrated at the exact value of the reference gage at the moment of its occultation and the final indication of the counter will be the dimension which it was sought to determine. In one form of construction, this information also appears at coded outputs in order to permit of its subsequent use in peripheral equipment of computers (punching machines, printers, and so forth).

Once the first stop has been calibrated and the corresponding value has been indicated on the counter, the apparatus can be employed for a large number of measurements without any need to resort to further calibrating operations, provided that the temperature of the premises in which the measurements are performed does not undergo any rapid variations.

In any case, in order to secure a large measure of freedom from the requirements of very extensive air conditioning in the measuring premises, one characteristic feature of the present invention consists in coupling the two rods which serve as a reference gage by means of a bridge, the horizontal portion of which is formed of material having a coefficient of expansion which is identical or very close to that of the material of the sample to be measured. In this manner, the spacing of the reference stops varies to the same extent as the sample under the action of temperature.

In the case of continuous measurement of a large number of samples having substantially similar dimensions (this is the case, for example, of production-run testing), the measurement is carried out by oscillation of each light ray between the reference gage and the body to be measured. The translational movements of the stepping motors are stopped automatically by the trip system as soon as occultation by one of said objects has been detected by the photosensitive diode. Very high speeds are then attained (up to one measurement every two seconds, for example), with the result that the performances of this apparatus are of very considerable interest.

In any case, the characteristic features of the apparatus in accordance with the invention for the accurate measurement of dimensions of objects will be brought out more clearly and in greater explanatory detail in the following description of one example of application, reference being made to the accompanying figures, in which.

Figure 1:
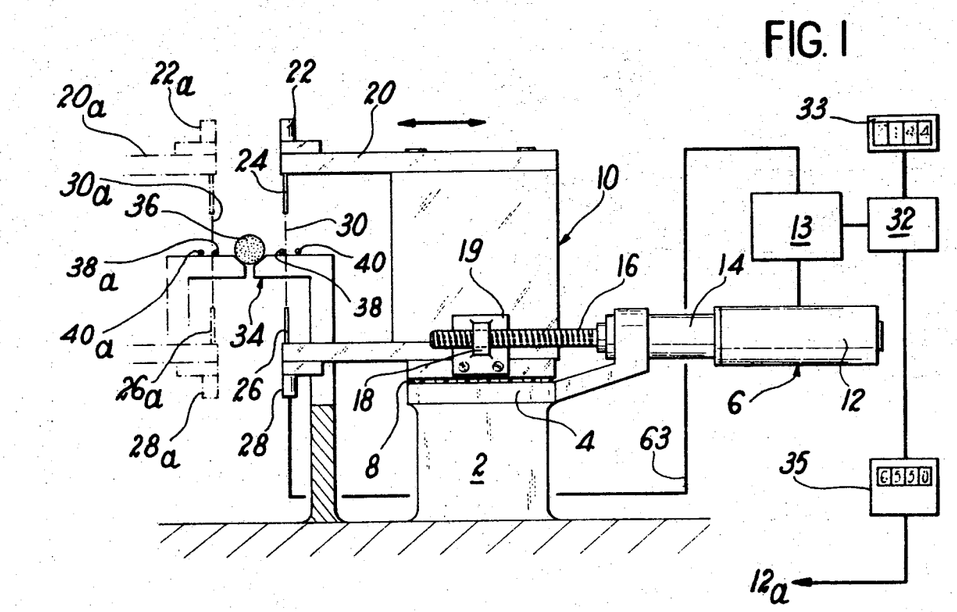
FIG. 1 is a general view in elevation showing the complete apparatus in accordance with the invention.

The general view of the apparatus as provided in FIG. 1 serves to show the relative arrangement of the essential elements. For the sake of enhanced clarity, the apparatus is not illustrated in its entirety since the left hand side is identical with the right hand side. It will therefore be considered sufficient to adopt a reference system in which an element located on the left hand side and corresponding to an element on the right hand side is designated hereinafter by a numeral having an index $a$. The stationary horizontal frame 2 supports the roller-bearing table 4 and the driving unit 6. The carriage 10 is supported on the roller-bearing table 4 by the high-precision bearing 8 which is of conventional design. The driving unit 6 is made up of the motor 12 proper, its programmer 13, the reduction-gear system 14 and the lead-screw 16; this latter is set in rotation by the stepping motor 12 through the reduction-gear system 14 and cooperates with the floating nut 18 which is rigidly fixed to the carriage 10 by means of the nut casing 19, thereby causing the translational motion of said casing with respect to the stationary horizontal frame 2. The carriage 10 has a stirrup-shaped terminal member which is designated by the reference numeral 20 in the figure and is coupled in translational motion with the carriage.

In accordance with the invention, an optical system is mounted on the end portion of the stirrup 20 and comprises successively in the direction of propagation of the light a lamp 22 of the gallium arsenide type, a first capillary tube 24, a second capillary tube 26 and a silicon-type photodiode 28 which constitutes the photosensitive receiver of the optical system. The two capillary tubes 24 and 26 define the light ray 30, namely the luminous flux which is transmitted by the lamp 22 to the sensitive cell 28 in a practically zero solid angle. The optical system which is thus formed is therefore extremely simple and does not comprise in particular any lens or spherical refracting surface apart from those which form an integral part of the diode of light-emission lamp and of the receiving photodiode.

The capillary tubes 24 and 26 as well as the diodes 22 and 28 are attached to the stirrup 20 by any suitable means; however, in order to ensure minimum spacing between the light rays 30 and 30a or, in the final analysis, the measurement of diameters which are as small as possible, the capillary tubes 24 and 26 are preferably inserted in the actual extremities of the stirrup-pieces 20.

A step counter 32 serves to record simultaneously the pulses which actuate respectively the motor 12 and its counterpart 12a and consequently stores a numeral which represents at each moment the distance in horizontal translational motion between the light ray 30 and the corresponding light ray 30a. In the example herein described, this distance is recorded directly in $\mu$m on the numerical indicator or display device 34 at the end of each measurement.

The object 36 which is to undergo dimensional measurement is intended to rest on the stationary supporting stage 34 and this latter is located in the horizontal mid-plane which is common to both stirrups 20 and 20a, there being fixed on said stage the bridge-shaped member 37 which retains the optical gage 38 as well as the optical stop 40 and their counterparts 38a and 40a.

Figure 2:
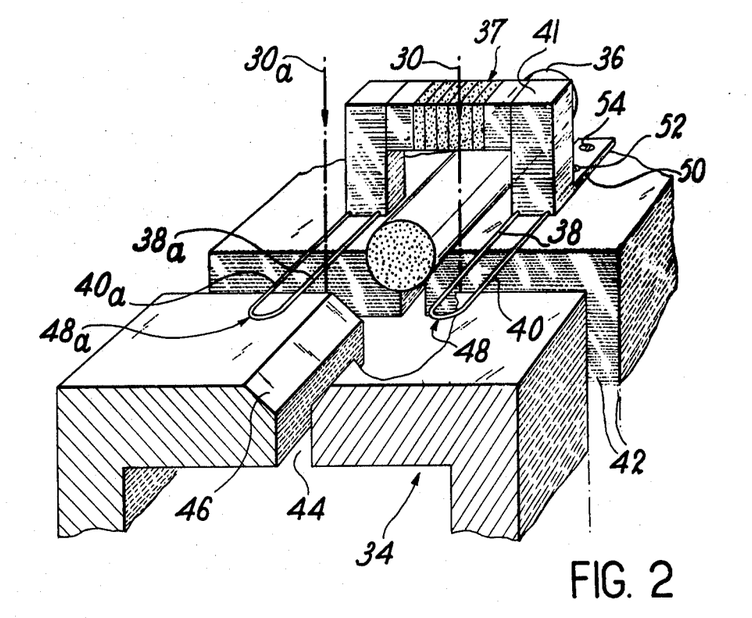
FIG. 2 is a view in isometric perspective and on a larger scale showing the stationary supporting stage which is fitted with its optical stops.

FIG. 2 provides a clearer illustration on a larger scale and shows the constructional details of the stationary supporting stage 34. It is apparent from this figure that said plate 34 is provided with two slots which are located at right angles to each other; the first slot 32 is intended to permit the passage of the light rays 30 and 30a through the supporting stage 34 at the time of horizontal translational motion of said rays; the second slot 44 is located at right angles to the first and its side walls 46 are cut in a V-shape in order that said slot may thus be permitted to support the sample 36 to be measured; said second slot is also intended to provide a passageway for the gripping claws which are not shown in FIG. 2 but will be described hereinafter with reference to FIG. 3, the samples to be measured being brought successively into the measurement field of the apparatus. FIG. 2 also serves to show the constructional detail of the optical gages and stops 38, 38a, 40 and 40a which are necessary for the operation of the apparatus: in the exemplified embodiment of FIG. 2, said STOPS AND GAGES ARE formed by means OF a member 48 having substantially the shape of a hairpin which is rigidly fixed to the base of each pillar of a bridge-shaped member 37, only one side 41 of said member 37 being secured to the supporting stage 34 by means of the plate 50 and being integral with this latter; said plate 50 is in turn screwed into the supporting stage 34 by means of the screws 52 and 54. For the sake of convenience in the case of repetitive measurements of substantially equal diameters, the inner stops 38 and 38a are chosen so as to ensure that they are spaced at a distance which is only very slightly greater than the diameter of the object 36 to be measured. It is therefore only for the sake of enhanced clarity that the proportions of the different elements are not maintained in the different figures.

Figure 3:
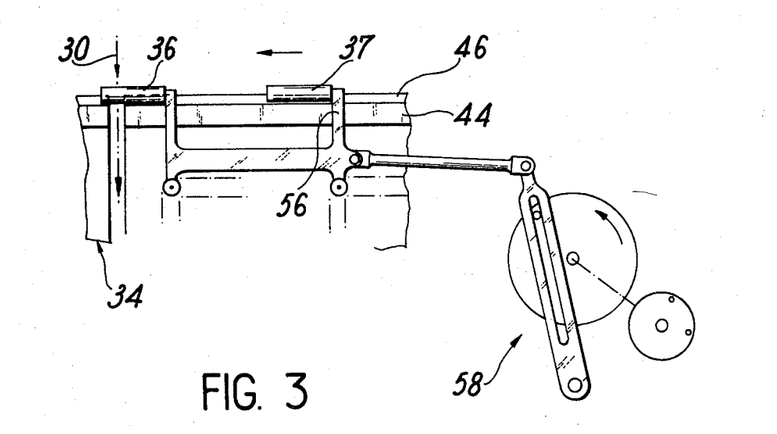
FIG. 3 is a diagram which illustrates one of the possible embodiments of the device for transferring samples to be measured.

FIG. 3 illustrates one form of practical application of the device for displacing objects to be measured within the slot 44 of the supporting stage 34. In this embodiment, the samples such as 36 and 37 are gripped by means of a device in the form of claws 56, this device being in turn driven by a cam system 58; the claw device 56 has the double function of gripping the samples and subsequently pushing these latter in translational motion into the field of the apparatus in which the measurement is carried out opposite to the light ray 30. In the particular case of FIG. 3 in which small cylindrical parts are tested for constancy of diameter over the entire length of each part, the length feed or distance of forward travel of the claw 56 is such that the diameter of each cylindrical part is checked at two levels along the length of each part. However, it is readily apparent that a device of this type which is known per se has no direct bearing on the invention and that any equivalent system can be employed without thereby departing from its scope.

Figure 4:
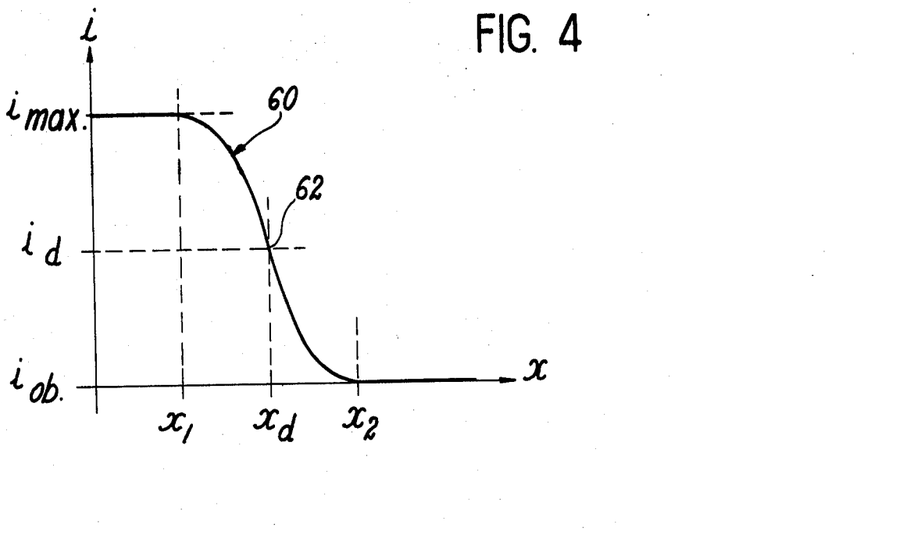
FIG. 4 shows the curve of variation in intensity of the current delivered by the photosensitive receiver as a function of the elongation $x$ of a light ray when this latter passes through an occultation zone.

FIG. 4 serves to demonstrate one of the essential features of the apparatus according to the invention, namely the possibility of defining without ambiguity a precise state of translational motion of one of the light rays. This state will be adopted by way of definition for what will be referred-to hereinafter as the occultation of a light ray by one of the obstacles which said light ray is intended to encounter during the operating cycle of the apparatus. This definition is of marked significance since it has the effect of endowing the occultation aforesaid with the property of reproducibility and arises from the following analysis.

The graph of FIG. 4 represents as ordinates the intensities i which are delivered by the photosensitive silicon diode which is located at the output of the second capillary tube, namely as a function of the horizontal movements of translation x of the carriage which serves as a support for the corresponding light beam. As and when an occultation takes place, the current i changes from its maximum value $i_{max}$ to its minimum value which is equal to the dark current $i_{ob}$ of the silicon diode which is employed. The value $i_{max}$ of the current evidently corresponds to the intensity produced by the total luminous flux received by the diode when no foreign body is present on the path of the ray; the value $i_{ob}$ of the current corresponds to the output of the diode when no light signal has been received from the optical system or in other words when said diode is in a state of total occultation; in the example described, $i_{max}$ is of the order of 10 to 15 × $10^{-3}$ amps according to the diode which is chosen and $i_{ob}$ is of the order of 5 to 10 × $10^{-9}$ amps. The geometrical precision of the light ray obtained as a result of the combined use of both capillary tubes, the very high sensitivity of the silicon photodiodes and the stability of the light source employed have made it possible to plot the curve 60 of current variation from which it is noted that said curve has substantially the shape of an S with a point of inflexion 62 which is located at its center and that said point corresponds to a maximum slope of said curve 60. In the example described in which the capillary tubes have an internal diameter of 0.4 mm, the mean slope of this curve 60 which is constant from one occultation to the other is of the order of 0.025 $\mu$amps per $\mu$m. The threshold of operation of the trip system which serves to stop the stepping motors is set by definition at a value $i_d$ corresponding to the state of translation $x_d$ of the light ray. To this end, the indications of the diode 28 are transmitted through an electronic circuit 63 (shown in FIG. 1) to the programmer 13. This mode of procedure is made possible only by virtue of the above-mentioned characteristics of the apparatus according to the invention and makes it possible to define without any possible ambiguity and with complete freedom of reproduction the occultation point which defines the meeting of a light ray with an obstacle.

Figure 5:
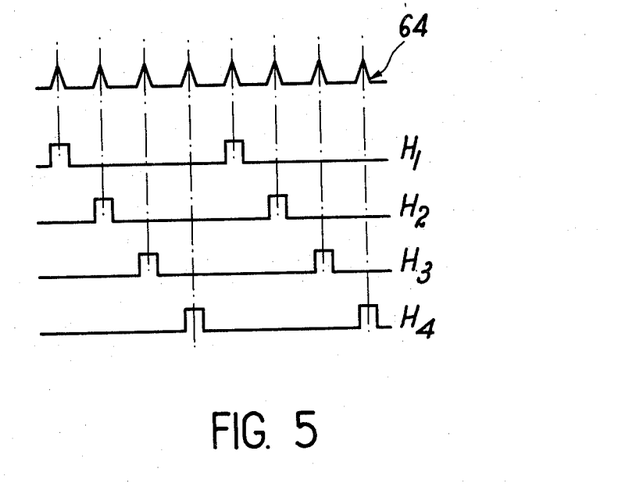
FIG. 5 is a diagram which shows the manner in which signals are produced from a time base in order to control four clocks, the function of said clocks being to control the movement of two stepping motors.

Finally, FIG. 5 represents the time distribution of the different electronic signals which control start-up and stopping of the stepping motors as a function of either the presence or absence of a signal derived from the photosensitive receivers. In FIG. 5, there is shown first of all a time base 64 constituted by a series of electric pulses having a frequency of 3,200 c/s in the exemplified embodiment described. Starting from this time base, there are produced four series of pulses H1, H2, H3 and H4 having a frequency which is one-quarter of the frequency of the time base 64, said pulses being displaced in phase by one pulse from one series to the next. These four series of signals thus constitute four clocks which operate respectively as follows:

the clock H1 controls the detector of the left-hand cell 28a;

the clock H2 controls the left-hand stepping motor 12a;

the clock H3 controls the detector of the right-hand cell 28;

the clock H4 controls the right-hand stepping motor 12.

The pulse delivered by H1 interrogates the detector of the left-hand photosensitive cell 28a which:

a. if said cell is illuminated, the pulse derived from the clock H2 is permitted to cause the left-hand motor 12a to progress by one step, b. if the cell is not illuminated, no progression is permitted.

The same applies respectively to the pulses of the clocks H3 and H4 relatively to the motor 12.

The motors 12 and 12a therefore operate independently of each other but in sequence one after the other and the interrogation of the two detectors which makes it possible to stop the motors takes place only after mechanical execution of the preceding step, thereby ensuring that stoppage takes place after one complete step has been performed. This is the essential condition of correct accounting of steps of the motors in the step-counter 32.

Figure 6:
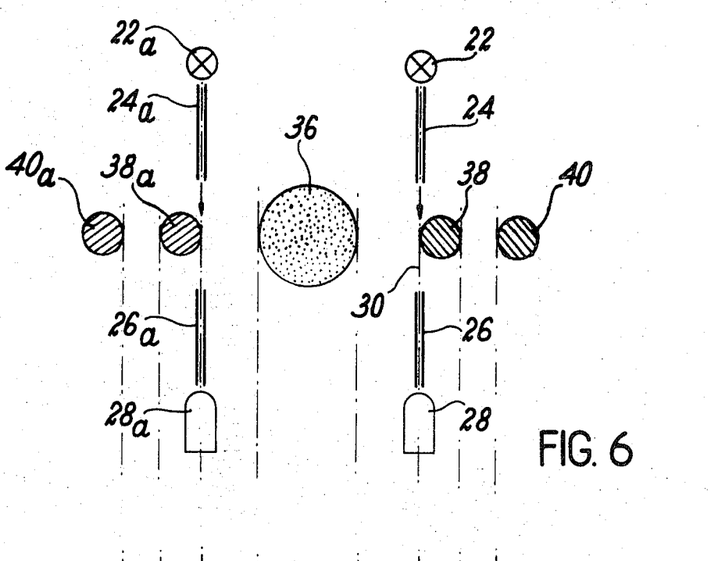
FIGS. 6 and 7 illustrate diagrammatically the program of operation of the apparatus.
Figure 7:
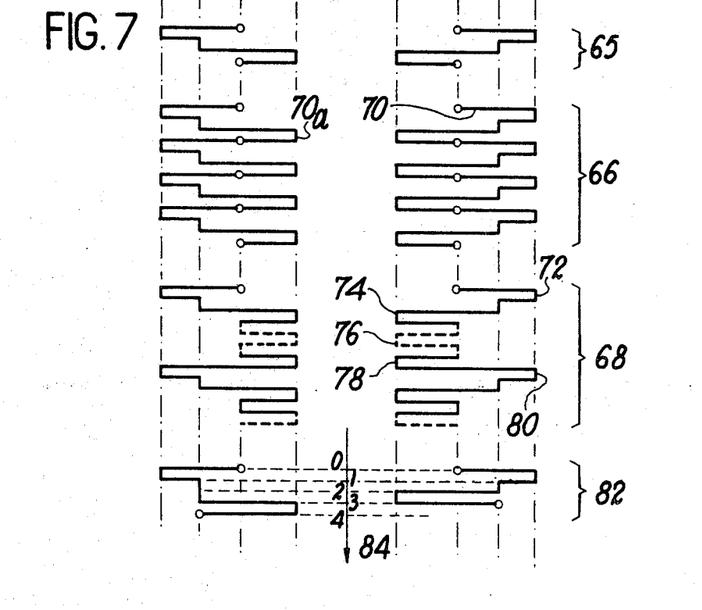

Referring now to FIGS. 6 and 7, the operation of the apparatus according to the present invention will be described.

FIG. 6 is a diagrammatic view in elevation showing the essential elements of the optical feeler and of the sample; FIG. 7 is intended to be considered in corresponding relation with FIG. 6 and shows diagrammatically in full lines the displacement of each of the light rays 30 and 30a respectively in the calibration stage 65, then in the two modes of operation of the apparatus, namely single-step operation with calibration prior to each measurement shown at 66 and automatic continuous-run operation 68 in which an initial calibration is followed by a number of measurements (for example about 20) before a further calibration is performed.

In FIG. 7, the points of stopping of the light rays are designated diagrammatically by small circles on the full line.

In the example herein described, the apparatus according to the invention is employed for measuring the diameter of pins or "pellets" of uranium oxide $UO_2$ having a diameter of 3.5 mm and a length of 5 mm. The degree of precision obtained in the measurements is to within less than 3 $\mu$ and the frequency of measurements is two measurements at 4-second intervals in the case of continuous inspection. In order to permit good legibility of the drawings, it has not been possible to maintain the proportions of the different elements of the apparatus; in particular, the pellet 36 to be measured and the stops 38, 38a, 40 and 40a are in fact very close together.

Each motor which is fitted with its reduction-gear unit initiates the forward displacement of the carriage over a distance of 1 $\mu$ at each step. At each stage of the program, starting-up of a stepping motor is made subject to fulfilment of three simultaneous conditions which are respectively:

a. the presence of an object to be measured beneath the measuring station;
b. stopping of the feed mechanism shown in FIG. 3;
c. occultation of the light rays 30 and 30a by one of the stops 38, 38a, 40 or 40a and the pellet 36 which is undergoing dimensional measurement.

On the contrary, each stepping motor 12 and 12a is stopped automatically as soon as no further light signal is received by one of the photosensitive diodes 28 or 28a as a result of occultation of one of the rays after it has been illuminated. The progression of each motor is independent of the other and, in accordance with the sequences represented by the clocks H1, H2, H3 and H4 of FIG. 5, each motor 12 and 12a operates in turn. The coordination of these different movements is carried out by means of a programmer 13 (shown in FIG. 1) and a control system which is of a type already known per se and does not form part of the present invention.

Before taking any measurement, the initial operation consists in calibrating the stop 38–38a by means of a calibrating gage in order that the stop may thus be permitted subsequently to perform its function of secondary gage. To this end, a high-precision gage of the Johnson type is placed in position instead of the pellet 36 to be measured. Any value which preferably corresponds approximately to the distance between the two stops 38 and 38a is then indicated manually on the predetermination device 33. Steps are finally taken to ensure that each beam is correctly occulted or cut off on the internal face of the reference stop 38 or 38a; a measurement operation in a unitary cycle (reference 65 in FIG. 7) is then initiated. Each light ray 30 and 30a then automatically follows a path such as 70 and 70a from the corresponding reference stop 38 and 38a up to the internal face of the stop 40. On the return travel, when the occultation takes place in the case of the two light rays 30 and 30a on the external face of the stops 38 and 38a, the counter 32 and its indicator or display device 35 are preset automatically at the value which has previously been selected in the predetermination device 33. THe displacement of the two rays 30 and 30a then continues in the same direction until both occultations are obtained on each face of the gage. The erroneous indication of the display device 35 is noted at this moment and, by simple subtraction with respect to the exact known dimension of the Johnson gage, the error committed at the time of manual setting in the predetermination device is accordingly determined and the exact difference in microns between the external faces of the stops 38 and 38a is deduced therefrom, said difference being then recorded manually and without error in the predetermination device 33; said stops 38 and 38a are then employed over a certain period of time as secondary distance gage. (A test has served to establish the fact that stability is achieved to within 1 $\mu$m over a period of 6 hours).

On completion of this primary calibration, the apparatus can be employed in two different ways, depending on whether it is employed for single-step unitary operation or for repetitive operation in the case of rapid measurements in series.

Under these conditions, one of the single-step measuring cycles such as those which are designated by the reference 66 comprises in the case of each light ray 30 and 30a the following displacements as specifically represented in FIG. 7:

increasing translational motion of the reference stop 38 to the internal face of the stop 40;
occultation;
re-starting in the direction of decreasing translational motion until occultation on the external face of the reference stop 38;
calibration of the counter which, at this stage, again records the value of the reference stop;
re-starting in the direction of decreasing translational motion until occultation on the external face of the object 36 to be measured;
indication of the dimension of the object;
return to the internal face of the reference stop;
stopping.

A further cycle is permitted by manual starting, in which case the beam is re-started in the direction of increasing translational motion until occultation occurs on the internal face of the outer stop 40 and so forth. The cycle which is triggered manually each time can thus be repeated indefinitely, calibration of the counter being carried out automatically prior to each measurement of an object 36.

This mode of operation can nevertheless be considerably accelerated when it is found necessary to carry out a continuous test on a large number of parts which have substantially the same dimension, in which case a rapid measuring cycle 68 is considered sufficient for the purpose. A cycle of this type consists in a calibration 72 which is identical with any one of the cycles 66; this calibration measurement 72 is followed by a series of consecutive measurements such as 74, 76, 78 and so forth, these measurements being distinguished by the fact that the operation consists only in subjecting the light ray to successive back-and-forth movements between the internal face of the reference stop 38 and the external face of the object 36 to be measured. After approximately twenty unitary cycles as thus defined, a re-calibration operation 80 is carried out automatically on the external face of the reference stop 38 and the counter 32 is thus always restored to the same value, thereby overcoming any thermal or electrical disturbances which might otherwise have occurred.

Moreover, if the distance between the internal faces of the reference stops 38 and 38a is close in value to the external diameter of the object 36 being measured, it is apparent that a series of measurements as mentioned above can be carried out at very high speed.

Throughout the remaining sequence of operations, the measurements are always carried out as a result of displacements of the motors which take place in the same direction; this mode of procedure makes it possible to eliminate any errors which might otherwise be introduced by non-reproducibility of mechanical translational movements of the lead-screw 16 and of the bearing 8, this being due in particular to the presence of oil films which may have a variable degree of homogeneity.

It must also be noted that the exact parallel relation of the two rays 30 and 30a is not critical by reason of the fact that, even they are not strictly parallel, the rays 30 and 30a will always be cut off at corresponding points of different samples from the moment these latter have diameters which are very close in value.

The diameter of objects to be measured is limited to the maximum value which has initially been set in regard to the amplitude of relative outward displacement of the carriages.

In the example described, the minimum diameter of objects to be measured is 3.5 mm when the operation of the apparatus is carried out in accordance with the programs which were described earlier and which permit the highest rate of measurement.

In another alternative embodiment, it is feasible to measure objects of the order of 0.2 mm in diameter with the same degree of accuracy by employing measurement programs which are different from that shown at 82 in FIG. 7. Said programs ensure that the optical feelers undergo the same operating cycle in the course of their displacement; the only difference lies in the displacement in time of the respective translational movements of the left-hand and right-hand carriages between the position of occultation by the reference stop 38 and the object 36 to be measured. These programs increase the length of the cycles by the time-duration of one translational movement between a reference stop 38 and the object 36. This is indicated on the scale 84 by the numeral 2 in the case of the right-hand carriage and by the numeral 3 in the case of the left-hand carriage.

By virtue of this method, the paths of each optical feeler above the object to be measured can be superimposed at two different moments. Under these conditions, the lower limit of the diameter of the object to be measured depends solely on the fineness of the light ray; the shadow cast by the object on the cell must in fact attain the minimum quantity of light which is capable of defining the occultation at the photosensitive detector.

What we claim is:

1. An apparatus for the accurate measurement of the diameter of cylindrical objects, comprising a stationary horizontal frame, a roller-bearing table mounted on said stationary horizontal frame, two identical carriages on said table supported by high-precision roller-bearings, each of said carriages carrying a substantially stirrup-shaped member and being located in oppositely-facing relation, each of said carriages being displaceable in horizontal translational motion on said frame by a driving unit, means for recording and indicating the state of translational motion of one of said carriages relative to the other, a light emitting and receiving optical system mounted on each of said stirrups providing between the top and bottom arms of the stirrup a high definition substantially vertical light ray in fixed relation to said stirrup, a stationary supporting stage located substantially in a central horizontal plane of said stirrups, a vertical slot in said stage through which said light rays defined by said stirrups pass, the cylindrical object whose diameter is to be measured resting on said supporting stage, and means for detecting at the time of translational motion of each of said carriages the occultation of the light rays by the cylindrical object to be measured, said optical system producing a high-definition light ray including in the direction of travel of light a light source, a first capillary tube fixed on the first arm of said stirrup, a second capillary tube and a photosensitive receiver fixed on the second arm of said stirrup, said two capillary tubes having very substantially the same geometrical axis defining said light ray with very high precision, four parallel bars mounted on said supporting stage parallel to the axis of the objects to be measured, the two external ones of said bars being optical stops limiting the translation of each luminous ray and the two internal ones of said bars being secondary gauges of distance during a series of measurements.

2. An apparatus according to claim 1, including means for carrying out automatic programming of the measuring cycles.

3. An apparatus according to claim 1, said driving unit for the translational motion of each of said carriages being a stepping motor mounted on said frame rotating a lead-screw through a reduction-gear unit, said lead-screw engaging in a floating nut rigidly fixed to said carriage.

4. An apparatus according to claim 1, said driving unit for the translational motion of each of said carriages being a motor of the continuous rotation type with rotary coder mounted on said frame to rotate a lead-screw through a reduction gear unit, said lead-screw engaging in a floating nut rigidly fixed to said carriage.

5. An apparatus according to claim 1, said means for indicating the state of translational motion of one carriage with respect to the other including a step counter accounting in the direction of subtraction the movements of translation bringing said two carriages towards each other and in the direction of addition the movements of translation of relative withdrawal of said two carriages.

6. An apparatus according to claim 4, said means for indicating the state of translational motion of one of said carriages with respect to the other including an angular displacement counter accounting in the direction of subtraction the movements of translation bringing said two carriages towards each other and in the direction of addition the movements of translation of relative withdrawal of said two carriages.

7. An apparatus according to claim 1, wherein the light source is an incandescent lamp.

8. An apparatus according to claim 1, wherein the light source is a gallium arsenide diode.

9. An apparatus according to claim 1, wherein the photosensitive receiver is a silicon photodiode.

10. An apparatus according to claim 1, each of said motors being controlled automatically by a sequence of pulses, stopping or changing of direction of the motors being initiated by the occultations of each light ray by the optical stop and the object to be measured.

11. An apparatus according to claim 10, the sequence of pulses establishing a unitary cycle for measuring a single object.

12. An apparatus according to claim 10, the sequence of pulses establishing a repetitive cycle for rapid measurement of a large series of objects.

13. An apparatus according to claim 1, including means for automatic progression of objects to be measured in the measurement field along a slot, side walls for said slot in the shape of a V in said stationary supporting stage.

14. An apparatus according to claim 1, including a predetermination device, means associated with said device for recording and indicating the state of translational motion of said carriages said device readjusting said means periodically to the dimension of said reference stops and manual means for introducing the dimension in said predetermination device.

15. Apparatus as described in claim 1, two of said bars being fixed to said supporting stage on one side of said object, the other two of said bars being on the opposite side of said object and being free and forming a leg of a hairpin shaped member having the same coefficient of expansion as that of the object to be measured, the other extremity of said hairpin shaped member being fixed to said supporting stage at the same point as said fixed bars whereby automatic compensation for variations of temperatures is obtained.

* * * * *